US006496772B1

(12) United States Patent  
Bolz

(10) Patent No.: US 6,496,772 B1
(45) Date of Patent: Dec. 17, 2002

(54) DEVICE FOR RADIOMETRIC SENSOR SIGNAL MEASUREMENT

(75) Inventor: Stephan Bolz, Pfatter (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 09/673,989
(22) PCT Filed: Apr. 1, 1999
(86) PCT No.: PCT/DE99/01018
§ 371 (c)(1),
(2), (4) Date: Dec. 18, 2000
(87) PCT Pub. No.: WO99/56084
PCT Pub. Date: Nov. 4, 1999

(30) Foreign Application Priority Data

Apr. 23, 1998 (DE) .......................... 198 18 315

(51) Int. Cl.[7] .............................. G01D 3/00
(52) U.S. Cl. .......................... 701/114; 701/115; 327/63
(58) Field of Search .................. 701/114, 115, 701/101, 102; 73/117.3, 118.2; 327/82, 63, 65, 77

(56) References Cited

U.S. PATENT DOCUMENTS

| 4,335,379 A | * | 6/1982 | Martin ........................ 324/451 |
| 4,644,570 A | * | 2/1987 | Brosh et al. ............ 324/207.16 |
| 4,750,353 A | * | 6/1988 | Wright et al. .............. 73/118.1 |
| 4,783,175 A | * | 11/1988 | Sugimori ..................... 374/163 |
| 5,191,781 A | * | 3/1993 | Denz ........................... 73/1.75 |
| 5,408,143 A | | 4/1995 | Gleim ........................... 327/82 |
| 5,650,608 A | * | 7/1997 | Redford et al. ........ 2503/208.2 |
| 5,710,723 A | * | 1/1998 | Hoth et al. .................. 702/181 |
| 5,729,443 A | * | 3/1998 | Pavlin ..................... 363/21.12 |
| 6,040,779 A | * | 3/2000 | Pfaff et al. ................. 324/706 |
| 6,252,503 B1 | * | 6/2001 | Berger et al. .......... 340/310.06 |
| 6,307,200 B1 | * | 10/2001 | Kuhnly et al. ........... 250/338.1 |

FOREIGN PATENT DOCUMENTS

| DE | 33 22 825 A1 | * | 1/1985 | ........... G01F/23/24 |
| DE | 07 190 802 A | | 7/1995 | |
| DE | 44 04 999 A1 | | 8/1995 | |
| DE | 196 29 747 A1 | | 1/1998 | |
| DE | 196 36 838 C1 | | 1/1998 | |
| JP | 198 413 A | | 8/1995 | |
| WO | WO 92/00504 | | 1/1992 | ............ G01D/5/16 |

* cited by examiner

Primary Examiner—Hieu T. Vo
(74) Attorney, Agent, or Firm—Laurence A. Greenberg; Werner H. Stemer; Ralph E. Locher

(57) ABSTRACT

A device for ratiometric sensor signal measurement has a multiple arrangement of sensors (gas pedal transmitters and throttle valve transmitters air mass flowmeters, etc.) in motor vehicles. The supply voltage V5int for an analog/digital converter ADC integrated in the engine control unit ST in a microcontroller $\mu C$ and the sensor reference voltages V5a, V5b are generated in a common voltage controller SR having a common voltage reference Ref1 which is monitored (ÜW1). The supply voltage V5int is additionally monitored by a monitoring circuit ÜW2 having an independent voltage reference Ref2.

3 Claims, 2 Drawing Sheets

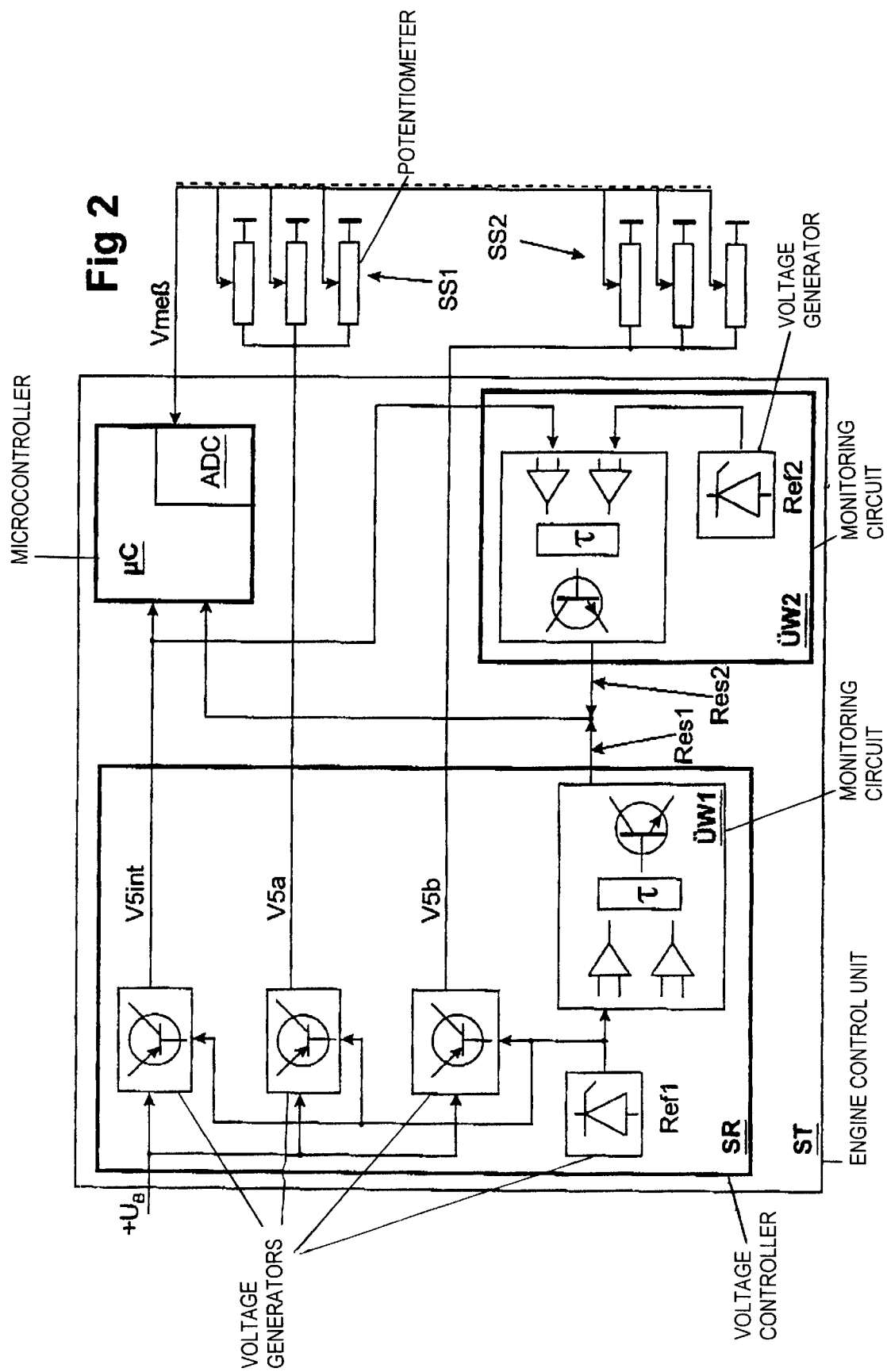

US 6,496,772 B1

DEVICE FOR RADIOMETRIC SENSOR SIGNAL MEASUREMENT

BACKGROUND OF THE INVENTION

Field of the Invention

The invention relates to a device for the ratiometric measurement of sensor signals, particularly in motor vehicle electronics.

Motor vehicle internal combustion engines are increasingly being fitted with an electronic gas pedal (E gas) and electronic traction control (ETC). To determine the position of the gas pedal, throttle valve, air mass flowmeter, etc., potentiometers with a reference voltage applied to them, for example, are used as pedal value transmitters, throttle valve transmitters, air mass transmitters, etc.; the ratios of the voltages which can be measured at their taps to the reference voltage are a measure of the respective position of the associated transmitter.

DE 196 29 747 A1 discloses a sensor device which has a first reference voltage applied to it and generates a ratiometric measured signal; the ratio of the first to a second reference voltage is formed and is used to correct the measured signal.

For reasons of operational reliability, such transmitters are usually-embodied in multiples and are supplied from mutually independent voltage sources.

The demands on the measurement accuracy of sensors in motor vehicle electronics are becoming higher and higher. Many measured values are transmitted from the sensors to a processing microcontroller $\mu C$ as analog DC voltages Vmeβ (0 . . . 5V+0 . . . 100%). The microcontroller digitizes them using an analog/digital converter ADC (e.g. 10 bit ADC: 0 . . . 5V+0 . . . 1023 steps). In an analog/digital converter, the measured voltage Vmeβ to be converted is set in relation to a reference voltage. To convert the analog values to digital values as accurately as possible, it is therefore desirable for the sensors and the analog/digital converter ADC to use the same reference voltage.

In motor vehicle electronics, this is generally not possible because the reference voltage used for the analog/digital converter ADC integrated in the microcontroller $\mu C$ is the supply voltage V5int for the microcontroller $\mu C$ (VAref= V5int). Since, however, the microcontroller and hence the engine/transmission control unit need to remain operational in the event of a short circuit, for example between a sensor line and ground or the battery, the supply voltage V5int for the microcontroller $\mu C$ must not be routed to the vehicle wiring harness. For this reason, mutually independent supply and reference voltages are required.

A principal cause of measurement errors is the synchronism of the individual supply and reference voltages. For an engine control unit ST containing a microcontroller $\mu C$, the following voltages are required, for example, in the case of dual transmitters:

an internal supply voltage V5int for the microcontroller $\mu C$, which is simultaneously the reference voltage for an analog/digital converter ADC integrated in said microcontroller and required for ratiometric measurements of the transmitter voltages and the conversion thereof to digital values required for further processing, a reference voltage V5a for the first transmitter set SS1 (pedal value transmitter 1, throttle valve transmitter 1, air mass transmitter 1, etc.), and a reference voltage V5b for the second transmitter set SS2 (pedal value transmitter 2, throttle valve transmitter 2, air mass transmitter 2, etc.). In this context, the notation V5int signifies the internal 5 volt supply voltage for the microcontroller $\mu C$, whereas V5a and V5b signify the 5 volt reference voltages for sensors arranged outside of the engine control unit ST. The supply voltage for microcontrollers and sensors is usually 5V.

As already mentioned, the voltages V5int, V5a and V5b need to be independent of one another, i.e. the other voltages must not be impaired in the event of one of these voltages being shorted.

In addition, the supply voltage V5int and hence the operating range of the microcontroller $\mu C$ need to be monitored. If the supply voltage is outside the prescribed operating range of, for example, V5int 5V±250 mV, reliable operation of the engine controller is no longer ensured. Subsequently possible uncontrolled operation of the microcontroller $\mu C$ and hence of the engine control unit ST can result in personal injury and should be avoided absolutely. The microcontroller $\mu C$ needs to be stopped in this case.

optimum synchronism would be possible by integrating all the voltage sources in an integrated voltage controller having a common reference voltage source; however, this is hampered by the fact that, in the event of a fault in this common reference voltage source (for example as a result of faulty assembly or as a result of interference pulses), reliable voltage monitoring is not possible because such a fault cannot be recognized by the microcontroller $\mu C$.

One implemented compromise solution consists, as shown in FIG. 1, in an inherently known, first voltage controller SR1 generating the internal supply voltage V5int and the external reference voltage V5a using a common reference voltage Ref1 which is obtained from an operating voltage $U_B$ and is monitored by a monitoring circuit ÜW integrated in the first voltage controller SR1, and in a second, smaller voltage controller SR2 with a dedicated reference voltage source Ref2 generating the external reference voltage V5b. The monitoring circuit ÜW, shown as a box inside of the first voltage controller SR1, has a window comparator which is indicated by two operational amplifier symbols and whose output signal, possibly delayed by means of a timer τ, is output to the microcontroller $\mu C$ as a reset signal Res1 if the voltage reference exceeds or falls below prescribed limit values.

The timer τ is intended to permit a reset signal to be output only if the voltage reference exceeds or falls below the limit values for a particular time.

This embodiment produces good synchronism between the internal supply voltage V5int and the external reference voltage V5a, but loses the synchronism with respect to the reference voltage V5b. Reliable voltage monitoring is not possible in the event of a fault in this common voltage reference Ref1 either, because the limit values in the monitoring circuit ÜW are derived from the voltage reference Ref1 and are then likewise erroneous.

SUMMARY OF THE INVENTION

It is the object of the invention to provide a voltage supply device which permits good synchronism between all the voltages generated and ensures reliable voltage monitoring for the supply and reference voltages.

The invention achieves this object by means of a device for ratiometric measurement of sensor signals, comprising a voltage controller constructed to generate a first reference voltage from a received operating voltage, generate a supply voltage for a microcontroller, generate a sensor reference voltage for each one of a plurality of sensor elements selected as a sensor or a sensor set, and derive the sensor reference voltage, for each one of the plurality of the sensor elements, from the first reference voltage independently from the supply voltage.

A first monitoring circuit generates a first reset signal for stopping the microcontroller if the first voltage reference leaves a first prescribed voltage range.

A second monitoring circuit is constructed to generate a second reference voltage from the operating voltage independently from the first reference voltage, and generate a second reset signal for stopping the microcontroller if the supply voltage or the sensor reference voltage leaves a second prescribed voltage range.

An illustrative embodiment in accordance with the invention is explained in more detail below with the aid of a schematic drawing, in which:

BRIEF DESCRIPTION OF THE DRAWINGS

FIG. 2 shows a voltage supply device according to the invention.

DESCRIPTION OF THE PREFERRED EMBODIMENT

Figure 1:
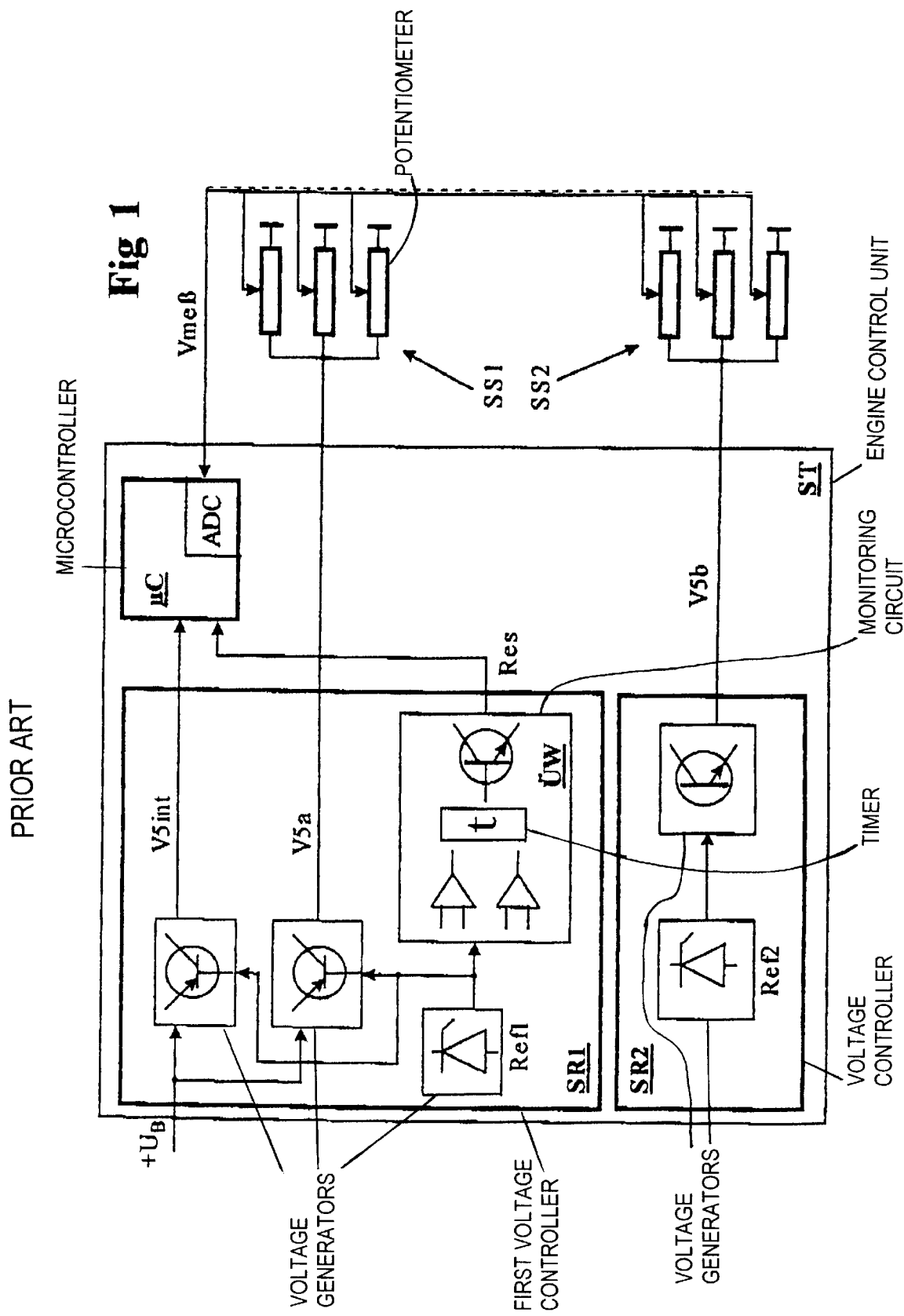
FIG. 1 shows a compromise solution, already implemented, for a voltage supply device.

In the case of the compromise solution shown in FIG. 1, the two aforementioned voltage controllers SR1 and SR2 and the microcontroller $\mu$C are arranged inside of an engine control unit ST, indicated as a box, while the dual potentiometer sets SS1 and SS2 with, by way of example, one pedal value transmitter, throttle valve transmitter and air mass transmitter each are arranged outside of said engine control unit.

The internal supply voltage V5int for the microcontroller $\mu$C and the external reference voltage V5$a$ for the first potentiometer set SS1 are generated in the first voltage controller SR1 using a common voltage reference Ref1 which is monitored by a monitoring circuit ÜW, while the external reference voltage V5$b$ for the second potentiometer set SS2 is generated in the second voltage controller SR2 using a dedicated reference voltage Ref2.

With this solution, although good synchronism is obtained between the internal supply voltage V5int and the external reference voltage V5$a$, the disadvantage here is that the synchronism with respect to the reference voltage V5$b$ is lost and that reliable voltage monitoring is not possible in the event of a fault in the common voltage reference Ref1.

The solution according to the invention is shown in FIG. 2. The engine control unit ST contains a voltage controller SR which is supplied with the operating voltage $U_B$ and has three mutually independent outputs which produce the internal supply voltage V5int and the two external reference voltages V5$a$ and V5$b$, which are controlled using a common voltage reference Ref1 derived from the operating voltage $U_B$ and hence exhibit good synchronism. The voltage reference Ref1 is monitored by means of a monitoring circuit ÜW1. This circuit outputs a reset signal Res1 to the microcontroller $\mu$C as soon as the voltage reference Ref1 exceeds or falls below prescribed limit values.

In the event of a fault in the common voltage reference Ref1, however, reliable voltage monitoring would not be possible in this case either. For this reason, there is a second monitoring circuit ÜW2 having a dedicated voltage reference Ref2 which is derived from the operating voltage $U_B$ but is independent of the voltage reference Ref1, and said second monitoring circuit monitors one of the output voltages from the voltage controller SR, preferably the internal supply voltage V5int for the microcontroller $\mu$C, and, for its part, outputs a reset signal Res2 to the microcontroller $\mu$C as soon as the internal supply voltage V5int exceeds or falls below prescribed limit values.

This solution meets all demands in terms of synchronism of voltages, independence of the outputs and reliable voltage control without any compromises. It is also economical. The silicon surface area requirement for this circuit is minimal in comparison with the solution shown in FIG. 1 with a second voltage controller SR2.

Since it is essentially the housing costs which determine the price in integrated circuits having such a small silicon surface area, it is advantageous to integrate the second monitoring circuit ÜW2 in another integrated circuit, situated in the engine control unit ST, for example to integrate it in the microcontroller $\mu$C, instead of using a standalone solution.

The invention can also be used in motor vehicle internal combustion engines which have no electronic gas pedal (E gas) and have only a throttle valve transmitter and an air mass flowmeter. The provision of two independent external reference voltages V5$a$ and V5$b$ permits the throttle valve transmitter and the air mass flowmeter to be supplied independently of one another. If one of these two transmitters fails, emergency running is then still possible, which means that the vehicle can be prevented from remaining at a standstill.

What is claimed is:

1. A device for ratiometric measurement of sensor signals, comprising:

a voltage controller constructed to:
generate a first reference voltage from a received operating voltage,
generate a supply voltage for a microcontroller,
generate a sensor reference voltage for each one of a plurality of sensor elements that are selected from the group consisting of a sensor and a sensor set, and
derive said sensor reference voltage, for each one of said plurality of said sensor elements, from said first reference voltage independently from said supply voltage, a first monitoring circuit generating a first reset signal for stopping the microcontroller if said first voltage reference leaves a first prescribed voltage range;

a second monitoring circuit constructed to:
generate a second reference voltage from said operating voltage independently from said first reference voltage, and
generate a second reset signal for stopping the microcontroller if a voltage selected from the group consisting of said supply voltage and said sensor reference voltage leaves a second prescribed voltage range.

2. The device according to claim 1, comprising:

the microcontroller, said plurality of said sensor elements, and an engine control unit for a motor vehicle internal combustion engine;

said plurality of said sensor elements providing analog output signals; and the microcontroller having an analog to digital converter integrated therein that receives said analog output signals from said plurality of sensor element.

3. The device according to claim 1, comprising an integrated circuit already forming part of an engine control unit; said second monitoring circuit integrated into said integrated circuit.

* * * * *